United States Patent
Gilliland

(10) Patent No.: US 11,041,560 B2
(45) Date of Patent: Jun. 22, 2021

(54) CAM-LOCKING SYSTEM FOR A RETRACTABLE DRIVESHAFT AND METHOD FOR USE THEREOF

(71) Applicant: Bell Helicopter Textron Inc., Fort Worth, TX (US)

(72) Inventor: Colton Gilliland, Northlake, TX (US)

(73) Assignee: Textron Innovations Inc., Providence, RI (US)

( * ) Notice: Subject to any disclaimer, the term of this patent is extended or adjusted under 35 U.S.C. 154(b) by 360 days.

(21) Appl. No.: 15/915,699

(22) Filed: Mar. 8, 2018

(65) Prior Publication Data

US 2019/0277392 A1    Sep. 12, 2019

(51) Int. Cl.
*F16H 57/022* (2012.01)
*B64D 35/00* (2006.01)
*F16H 57/02* (2012.01)

(52) U.S. Cl.
CPC .......... *F16H 57/022* (2013.01); *B64D 35/00* (2013.01); *F16H 2057/0221* (2013.01); *F16H 2057/02043* (2013.01)

(58) Field of Classification Search
CPC .......... F16H 57/022; F16H 2057/0221; F16H 2057/02043; B64C 29/0033; B64C 27/28; Y10T 403/7033; F16B 13/0808; F16B 21/02; F16B 21/125; F16B 7/042; F16B 2/00; B64D 35/00; B64D 35/06
See application file for complete search history.

(56) References Cited

U.S. PATENT DOCUMENTS

| | | | | |
|---|---|---|---|---|
| 2,921,473 A | * | 1/1960 | Fellows | F16D 43/06 74/7 C |
| 4,355,917 A | * | 10/1982 | Bunger | F02N 15/06 403/24 |
| 4,553,889 A | * | 11/1985 | Le Dantec | F16B 13/04 411/21 |
| 4,701,068 A | * | 10/1987 | Andrews | F16D 3/00 403/359.5 |
| 5,307,596 A | * | 5/1994 | Bockmiller | E04B 2/7416 52/235 |
| 5,360,376 A | | 11/1994 | Baldino | |
| 5,517,734 A | * | 5/1996 | Korpi | B60D 1/02 24/453 |
| 5,672,112 A | * | 9/1997 | Sbabo | B64C 27/82 403/325 |

(Continued)

*Primary Examiner* — Matthew R McMahon
(74) *Attorney, Agent, or Firm* — Lightfoot & Alford PLLC

(57) ABSTRACT

A cam-locking system for use with a retractable driveshaft that includes a housing, a cam carrier located at least partially in the housing, and a cam rotatably coupled to the cam carrier. Translation of the cam carrier along a central axis allows the cam to rotate into cooperative engagement with a catch recess on an interior surface of the housing, preventing the cam carrier from translating backwards, and thereby maintaining the retractable driveshaft in an engaged position. Further advancement of the cam carrier allows that cam to rotate into and unlocking gap in the interior surface of the housing, which enables the cam carrier to translate backwards along the central axis below the locked position, thereby disengaging the retractable driveshaft.

8 Claims, 9 Drawing Sheets

(56) References Cited

U.S. PATENT DOCUMENTS

| | | | | |
|---|---|---|---|---|
| 8,104,731 | B2* | 1/2012 | Faucher | ................ F16B 37/045 |
| | | | | 248/343 |
| 9,488,203 | B2* | 11/2016 | Sekretta | .................. B63B 21/04 |
| 9,523,502 | B2* | 12/2016 | Ruberte Sanchez | .... F23R 3/007 |
| 10,293,960 | B2* | 5/2019 | Shafer | ...................... B64G 1/64 |
| 2016/0325928 | A1* | 11/2016 | Lepek | ................. B65G 1/0471 |
| 2017/0058929 | A1* | 3/2017 | Shafer | ........................ F16B 2/12 |
| 2018/0355658 | A1* | 12/2018 | Nicolosi | .................. E06B 9/42 |

* cited by examiner

CAM-LOCKING SYSTEM FOR A RETRACTABLE DRIVESHAFT AND METHOD FOR USE THEREOF

BACKGROUND

Many types of aircraft include elongated wings that extend laterally from a fuselage. These types of aircraft generally occupy a large amount of space and have a large overall footprint. As such, when these types of aircraft are not in use, they occupy an undesirably large amount of space to store them on aircraft carriers, in hangers, runways, and other spaces. And furthermore, access to hangars and/or other indoor maintenance or repair facilities may be restricted because some types of aircraft may not fit through the doors and/or entrances of such facilities. Accordingly, technology has been developed that allows for the rotation of the wing relative to the fuselage to minimize the footprint of the aircraft. One such example is disclosed in U.S. patent application Ser. No. 15/898,550, filed Feb. 17, 2018, titled Selectively Engageable Aircraft Driveshaft Off-Axis From Component Stow Axis, which is incorporated herein by reference in its entirety. The selectively engageable driveshaft is translated along its axis of rotation between an engaged and disengaged position by an actuator. However, the actuator should not be relied upon to maintain the engagement. Therefore, an apparatus for locking the driveshaft in the engaged position is desirable.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a cam-locking system for locking a retractable driveshaft in an engaged position. While this disclosure describes the cam-locking system for use on an aircraft, its application is not so limited. It should be understood that the disclosed cam-locking system could be used with any application having a disengageable shaft.

Figure 1:
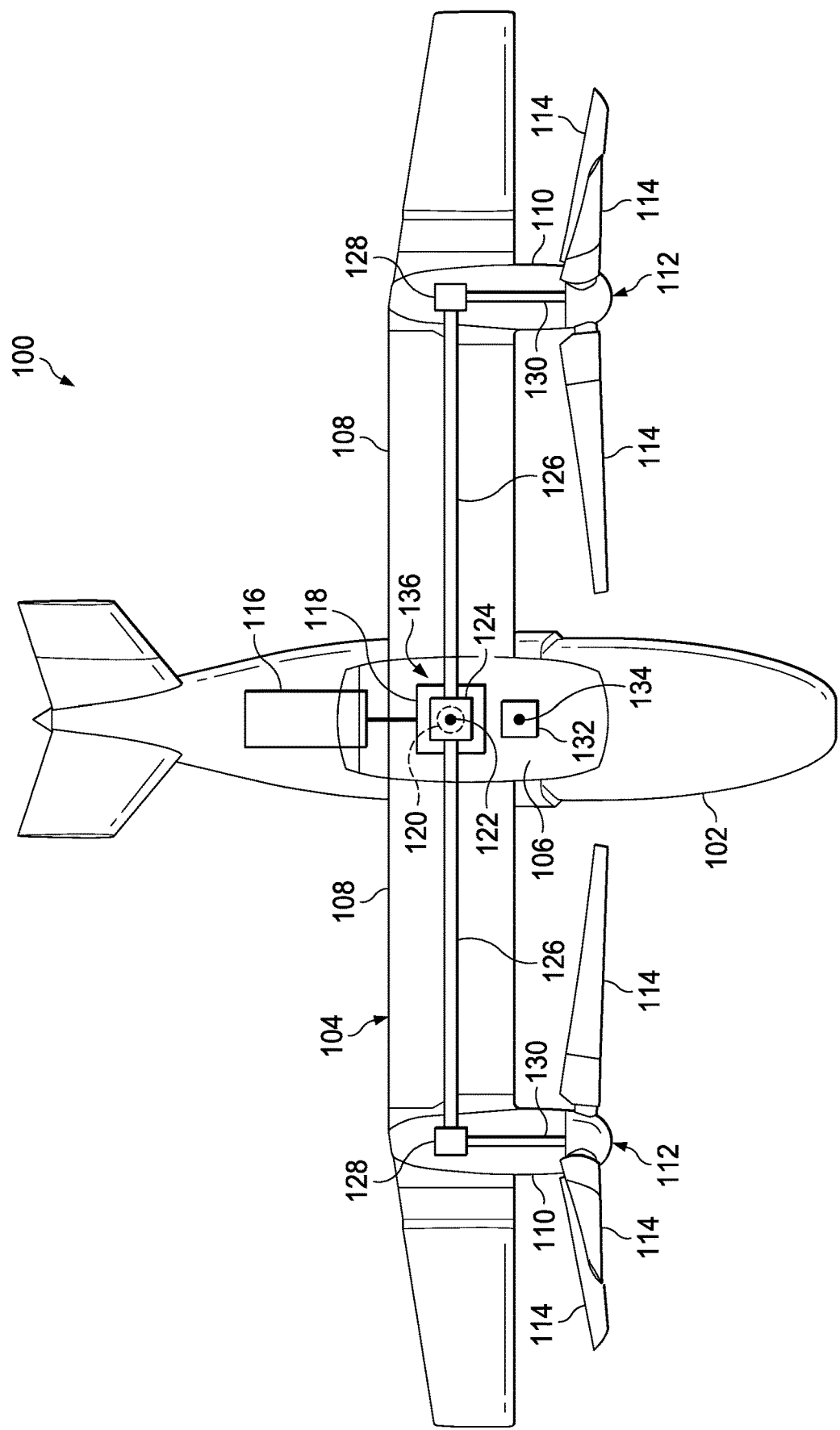
FIG. 1 is a top view of an aircraft according to this disclosure.

Referring now to FIG. 1, a top view of an aircraft 100 is shown according to this disclosure. Aircraft 100 is shown and described as a tiltrotor aircraft. However, aircraft 100 may be any type of vehicle. Aircraft 100 includes a fuselage 102 and a stowable wing assembly 104 including a rotatable wing body 106 and a plurality of wings 108 extending therefrom. Each wing 108 has a pylon 110 coupled thereto. Pylons 110 each include a rotor assembly 112 with a plurality of rotor blades 114. Each pylon 110 is rotatable between a horizontal orientation and a vertical orientation with respect to fuselage 102 and associated wing 108 to adjust the thrust angle and transition aircraft 100 between an airplane mode and a helicopter mode. Accordingly, the airplane mode is associated with a more horizontally-oriented thrust angle and propelling aircraft 100 forward in flight, while the helicopter mode is associated with a more vertically-oriented thrust angle and propelling aircraft 100 to and from a landing area.

Aircraft 100 also includes a drive component carried in fuselage 102. In the embodiment shown, the drive component includes an internal combustion engine 116 coupled to an engine reduction gearbox 118 which features a retractable driveshaft 120. However, in other embodiments, the drive component may comprise a direct-drive electric motor, a direct-drive engine, a motor and gearbox combination, or an engine and a redirection gearbox, each having retractable driveshaft 120. In the embodiment shown, operation of internal combustion engine 116 causes retractable driveshaft 120 to rotate about a rotation axis 122. Retractable driveshaft 120 is extended and retracted axially along rotation axis 122 to engage and disengage from an auxiliary or mid-wing gearbox 124 disposed within rotatable wing body 106 of wing assembly 104. Mid-wing gearbox 124 is operatively coupled to an interconnect driveshaft 126 extending therefrom through each wing 108 to a pylon gearbox 128 disposed in each pylon 110. Each pylon gearbox 128 is coupled to associated rotor assembly 112 through a rotor mast 130. Thus, when retractable driveshaft 120 is engaged with mid-wing gearbox 124, rotation of retractable driveshaft 120 imparted by internal combustion engine 116 is transmitted through mid-wing gearbox 124 to interconnect driveshafts 126 and rotor masts 130 to impart rotation to counter-rotating rotor assemblies 112. Conversely, when retractable driveshaft 120 is disengaged from mid-wing gearbox 124, rotation of retractable driveshaft 120 will not impart rotation to rotor assemblies 112. As such, retractable driveshaft 120 allows internal combustion engine 116 to operate to run pre-flight checks, provide electrical power, and/or provide functions of an auxiliary power unit without engaging rotor assemblies 112.

Aircraft 100 may also include a wing assembly rotation system 132 configured to rotate wing assembly 104 with respect to fuselage 102 about a stow axis 134. Most notably, stow axis 134 is offset from rotation axis 122 of retractable driveshaft 120. More specifically, stow axis 134 is displaced longitudinally along a length of fuselage 102 with respect to rotation axis 122 of retractable driveshaft 120. In some embodiments, the offset between stow axis 134 and rotation axis 122 may be about twelve inches. The location of rotation axis 122 is generally determined by the optimal placement of interconnect driveshafts 126 and/or mid-wing gearbox 124 within wing assembly 104. Stow axis 134 is generally selected to center wing assembly 104 over fuselage 102, thereby reducing the overall footprint of aircraft 100 when wing assembly 104 is rotated. Further, offsetting stow axis 134 further forward on wing assembly 104 may provide structural benefits, such as allowing rotation of wing assembly 104 in a thicker, more structurally rigid portion of wing assembly 104. Additionally, as will be discussed in more detail below, retractable driveshaft 120 must be capable of disengaging from mid-wing gearbox 124 and fully withdrawing from wing assembly 104 because stow axis 134 and rotation axis 122 are not co-axial. Because engine reduction gearbox 118, retractable driveshaft 120, mid-wing gearbox 124, and wing assembly rotation system 132 function together to facilitate the transition to a stowed configuration, they may be referred to collectively as a stow system 136.

Figure 2:
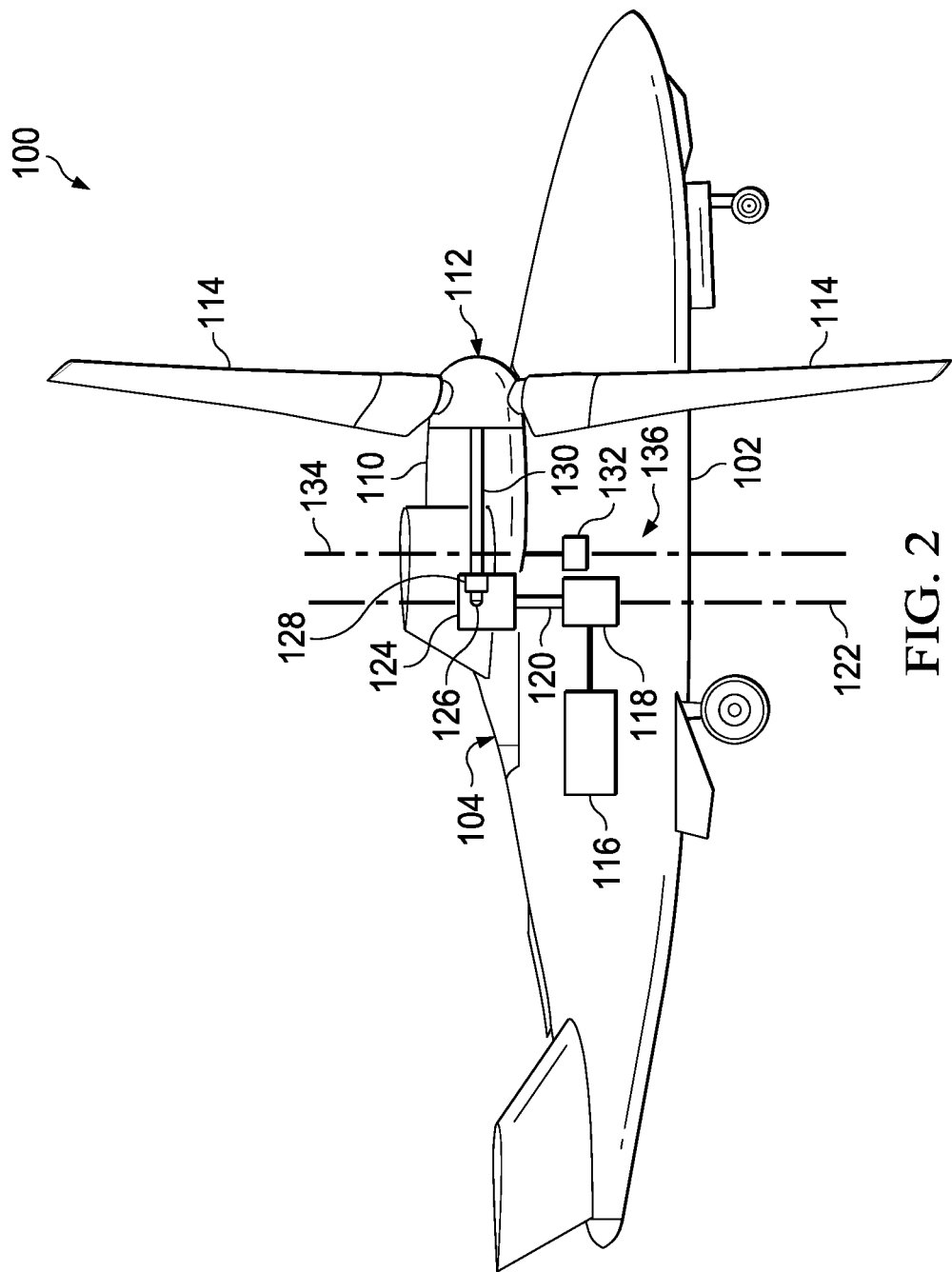
FIG. 2 is a side view of the aircraft of FIG. 1.

Referring now to FIG. 2, aircraft 100 is shown with retractable driveshaft 120 engaged with mid-wing gearbox 124 and wing assembly 104 in a flight position. As shown, retractable driveshaft 120 is extended vertically to engage mid-wing gearbox 124 when wing assembly 104 is configured in the flight position. Thus, when retractable driveshaft 120 is engaged with mid-wing gearbox 124, rotational motion of retractable driveshaft 120 imparted by internal combustion engine 116 is transferred through mid-wing gearbox 124 to interconnect driveshafts 126 and rotor masts 130 to impart rotation to counter-rotating rotor assemblies 112 to propel aircraft 100.

Figure 3:
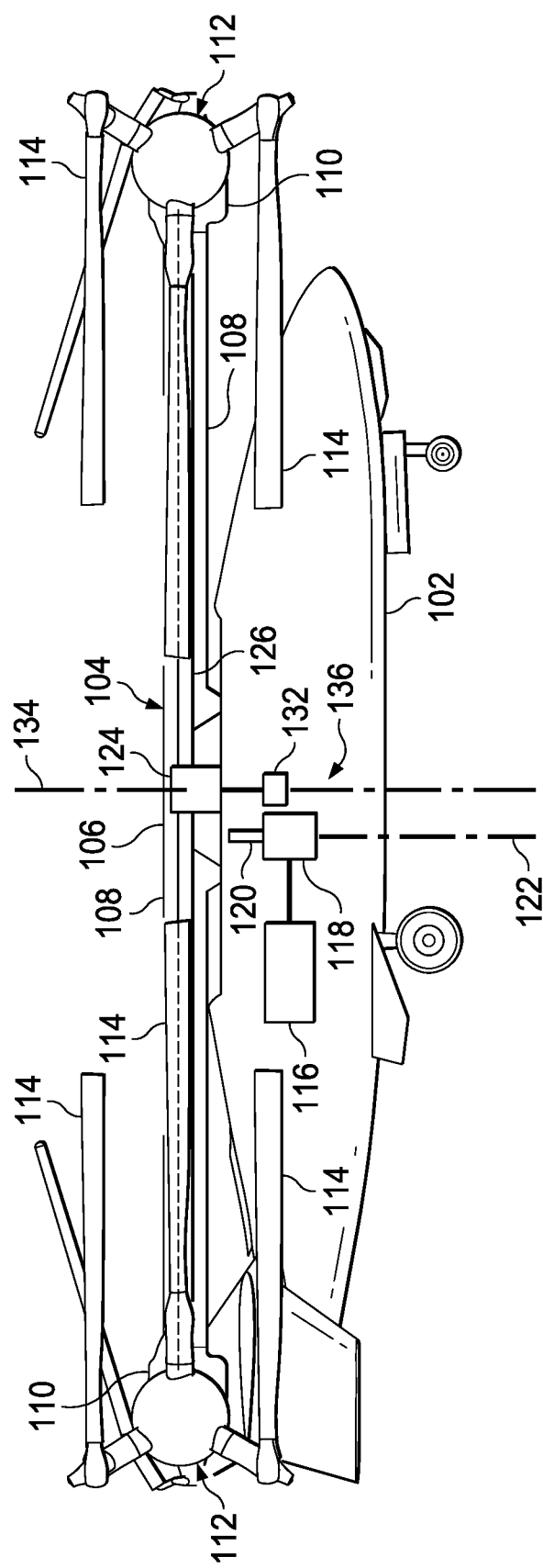
FIG. 3 is a side view of the aircraft of FIG. 1.

Referring now to FIG. 3, aircraft 100 is shown with retractable driveshaft 120 disengaged from mid-wing gearbox 124 and wing assembly 104 in a stowed position. As shown, retractable driveshaft 120 is retracted vertically to disengage from mid-wing gearbox 124. After retractable driveshaft 120 is disengaged from mid-wing gearbox 124, wing assembly 104 may be rotated relative to fuselage 102 about stow axis 134 in a clockwise direction as viewed from the top of aircraft 100 until wing assembly 104 reaches the stowed position. In the stowed position, retractable driveshaft 120 is misaligned from mid-wing gearbox 124. In some embodiments, the stowed configuration of wing assembly 104 may be reached after wing assembly 104 is rotated about ninety degrees. Furthermore, wing assembly 104 may be rotated relative to fuselage 102 about stow axis 134 in a counter-clockwise direction.

Figure 4A:
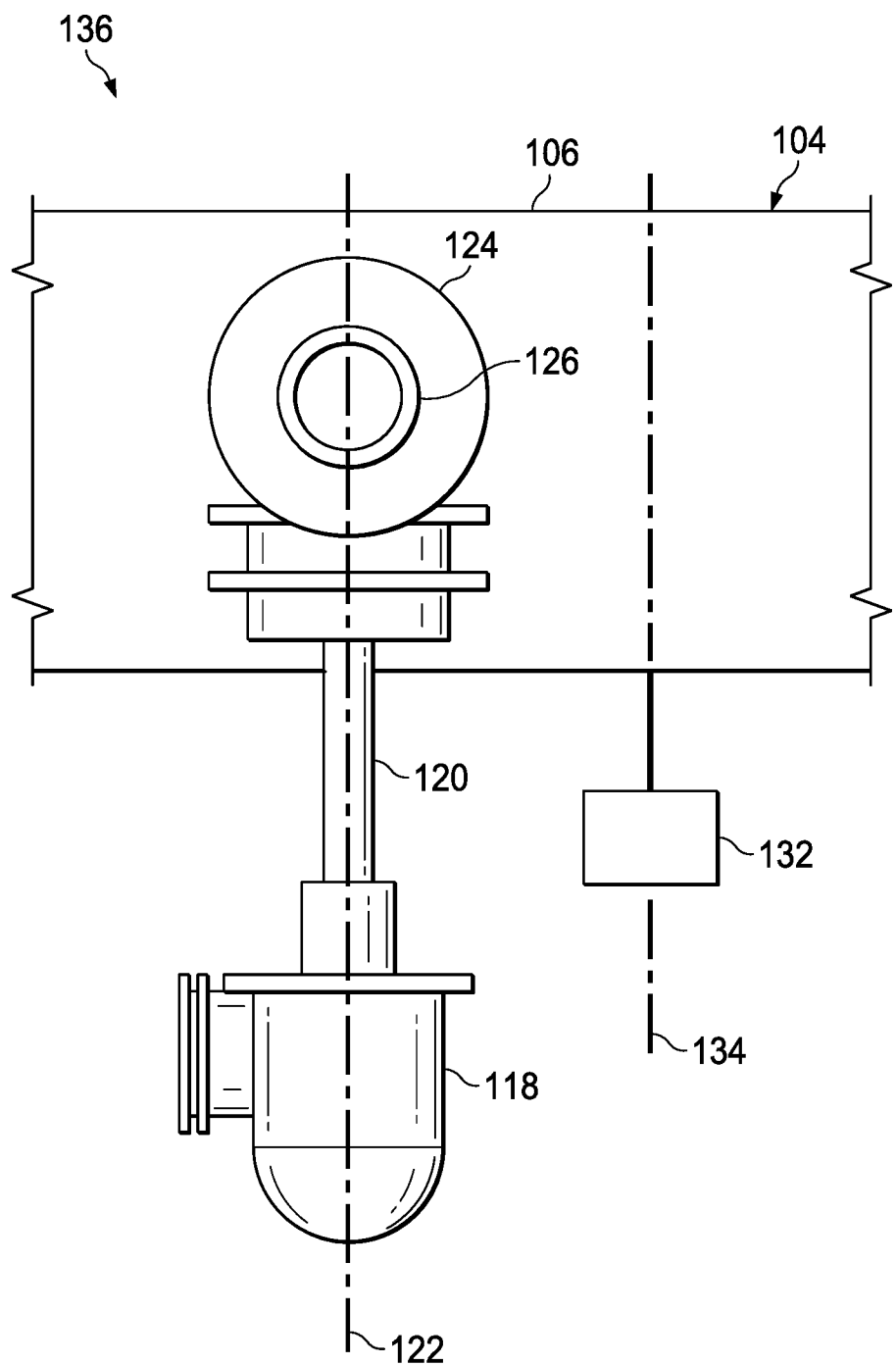
FIG. 4A is a side view of a stow system of the aircraft of FIG. 1 in an engaged position.
Figure 4B:
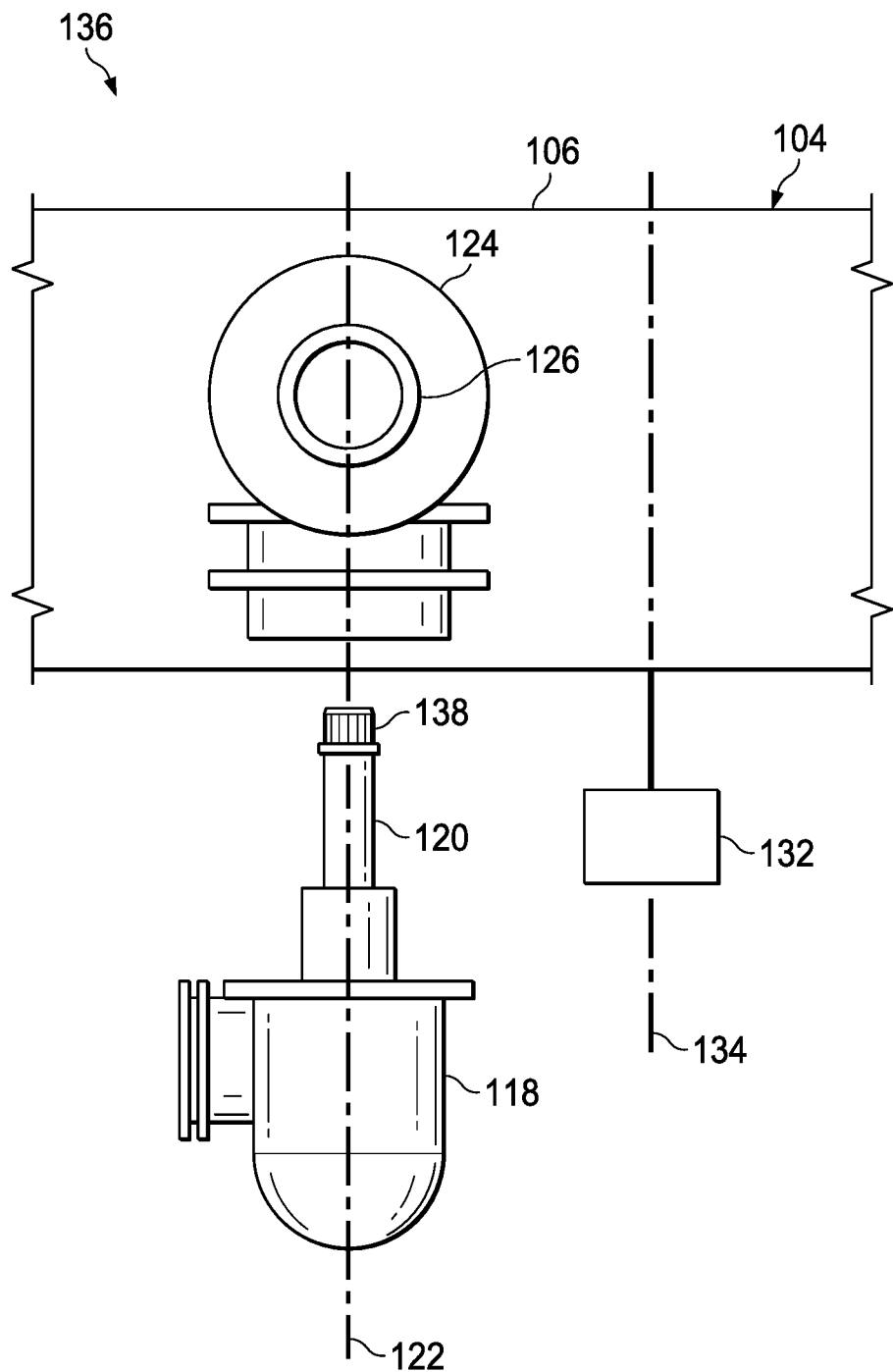
FIG. 4B is a side view of the stow system of the aircraft of FIG. 1 in a disengaged position.
Figure 4C:
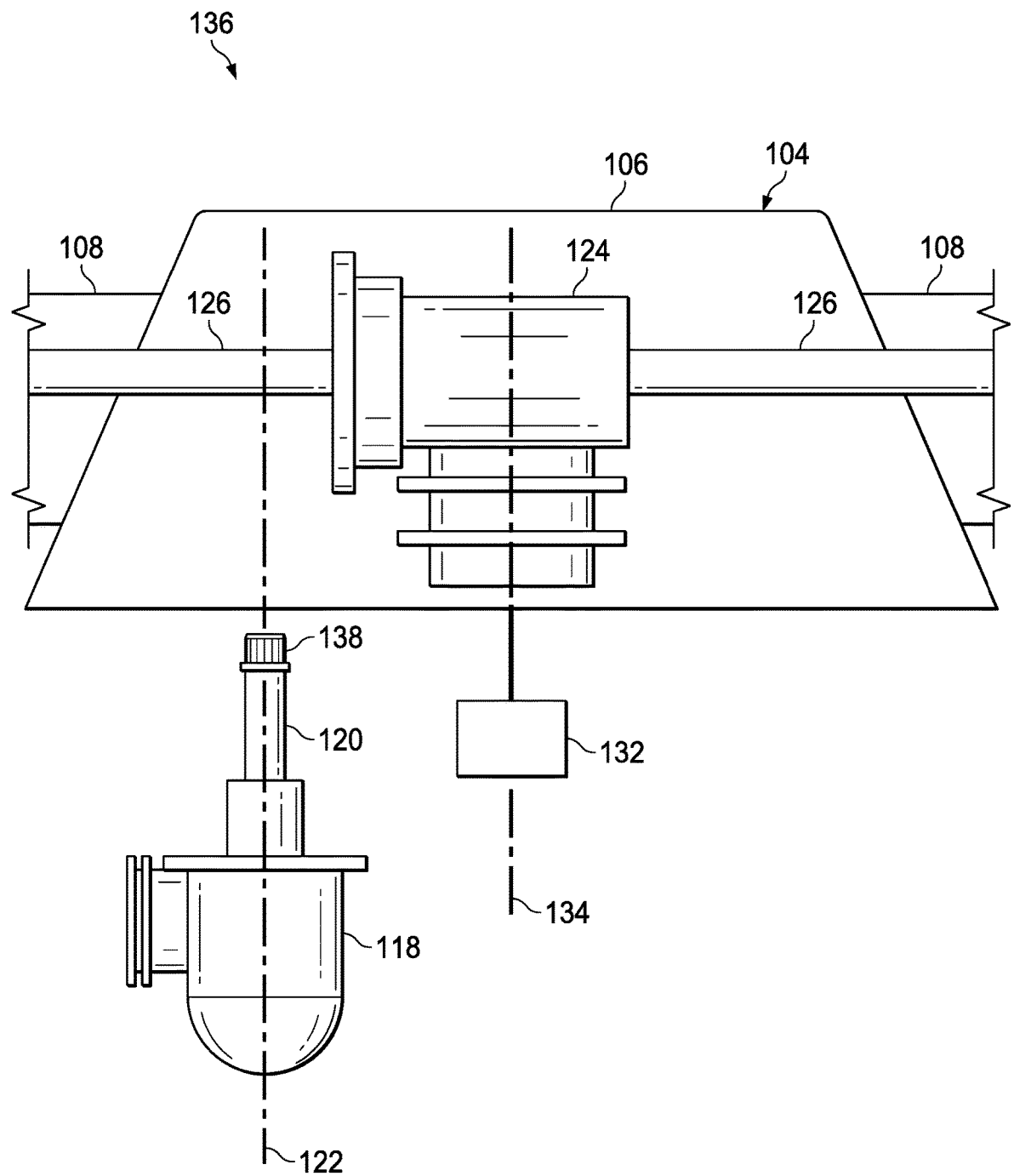
FIG. 4C is a side view of the stow system of the aircraft of FIG. 1 in the disengaged and stowed position.

Referring now to FIGS. 4A-4C, side views of stow system 136 of aircraft 100 of FIGS. 1-3 are shown according to this disclosure. More specifically, FIG. 4A shows retractable driveshaft 120 engaged with mid-wing gearbox 124 and wing assembly 104 in the flight position, FIG. 4B shows retractable driveshaft 120 disengaged from mid-wing gearbox 124 and wing assembly 104 in the flight position, and FIG. 4C shows retractable driveshaft 120 disengaged from mid-wing gearbox 124 and wing assembly 104 rotated about stow axis 134 into the stowed position. Retractable driveshaft 120 and mid-wing gearbox 124 comprise an interface designed to properly align splines 138 of retractable driveshaft 120 and mid-wing gearbox 124 when retractable driveshaft 120 is being extended to engage mid-wing gearbox 124.

In operation, retractable driveshaft 120 is extended and retracted to engage and disengage from, respectively, mid-wing gearbox 124. Retractable driveshaft 120 may be actuated electrically, electro-mechanically, hydraulically, and/or mechanically. For example, in some embodiments, retractable driveshaft 120 may be extended and retracted by a rack and pinion. However, in other embodiments, retractable driveshaft 120 may be extended and retracted by a machine screw type system. When retractable driveshaft 120 is engaged with mid-wing gearbox 124, as shown in FIG. 4A, retractable driveshaft 120 may be withdrawn to a retracted position as shown in FIG. 4B. After retractable driveshaft 120 is retracted, wing assembly 104 may be rotated relative to fuselage 102 about stow axis 134 until wing assembly 104 reaches the stowed position as shown in FIG. 4C. Once stow system 136 of aircraft 100 is configured as shown in FIGS. 3 and 4C, aircraft 100 may be parked, stowed, and/or driven into an entrance of a hangar while reducing the overall footprint of aircraft 100, thereby allowing for more compact storage of aircraft 100 and increased storage capacity of multiple aircrafts 100. Furthermore, from the stowed position shown in FIG. 4C, wing assembly 104 may be rotated relative to fuselage 102 about stow axis 134 until wing assembly 104 reaches the flight position as shown in FIG. 4B. Thereafter, retractable driveshaft 120 may be extended to engage with mid-wing gearbox 124 as shown in FIGS. 2 and 4A, where aircraft 100 is configured for flight.

Because engagement of retractable driveshaft 120 must be maintained with mid-wing gearbox 124 in order to maintain flight of aircraft 100, it is imperative that that engagement is failsafe. As discussed above, an actuator is utilized to extend and retract retractable driveshaft 120 in and out of engagement with mid-wing gearbox 124. However, the actuator should not be relied upon to maintain that engagement. Accordingly, there should be a locking mechanism responsible for maintaining the engagement, preferably one that is automatically engaged and disengaged by the actuator, without requiring additional input.

Figure 5A:
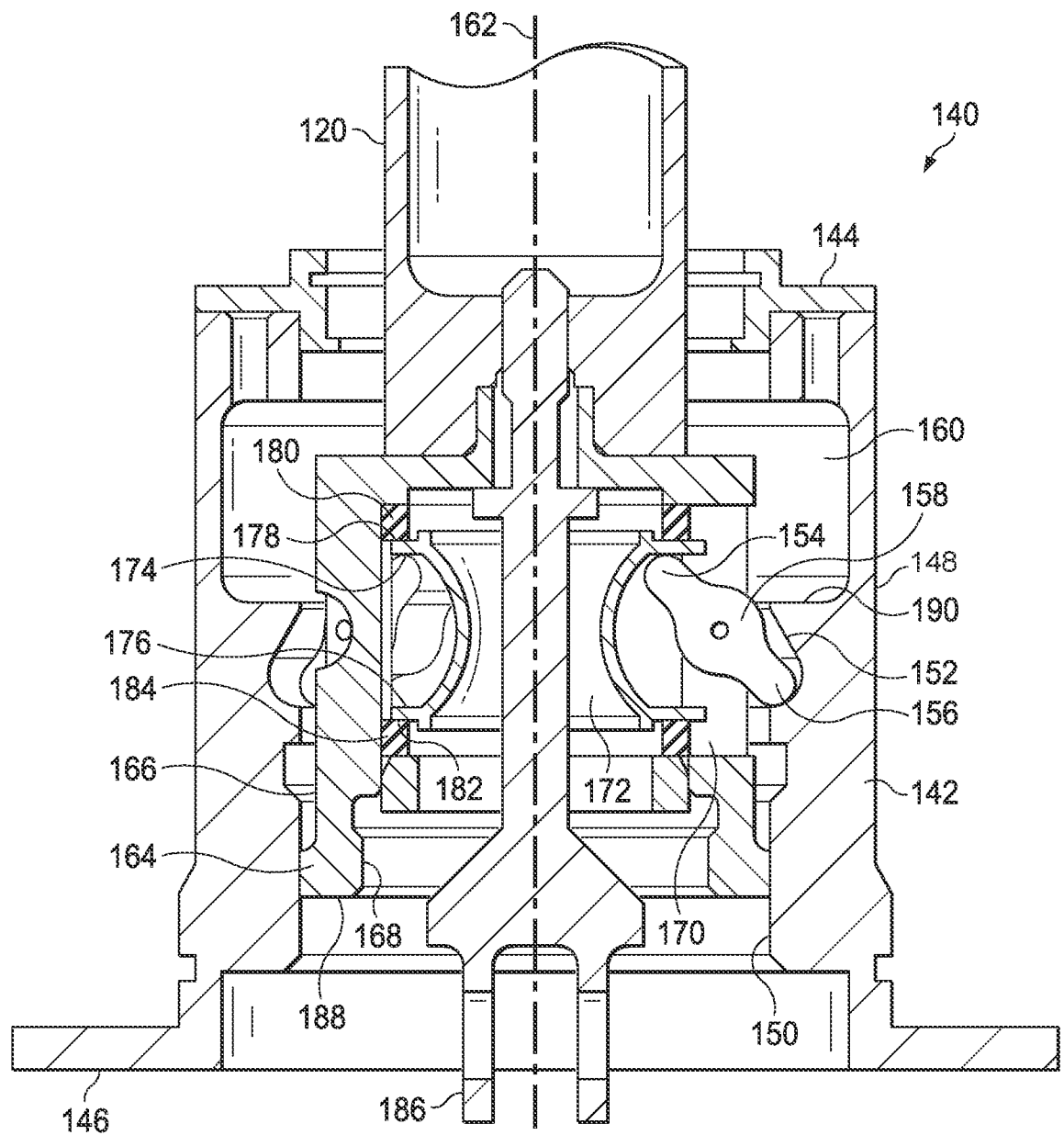
FIG. 5A is a cross-sectional side view of a cam-locking system for use with the stow system of FIG. 4A, shown in the locked position.
Figure 5B:
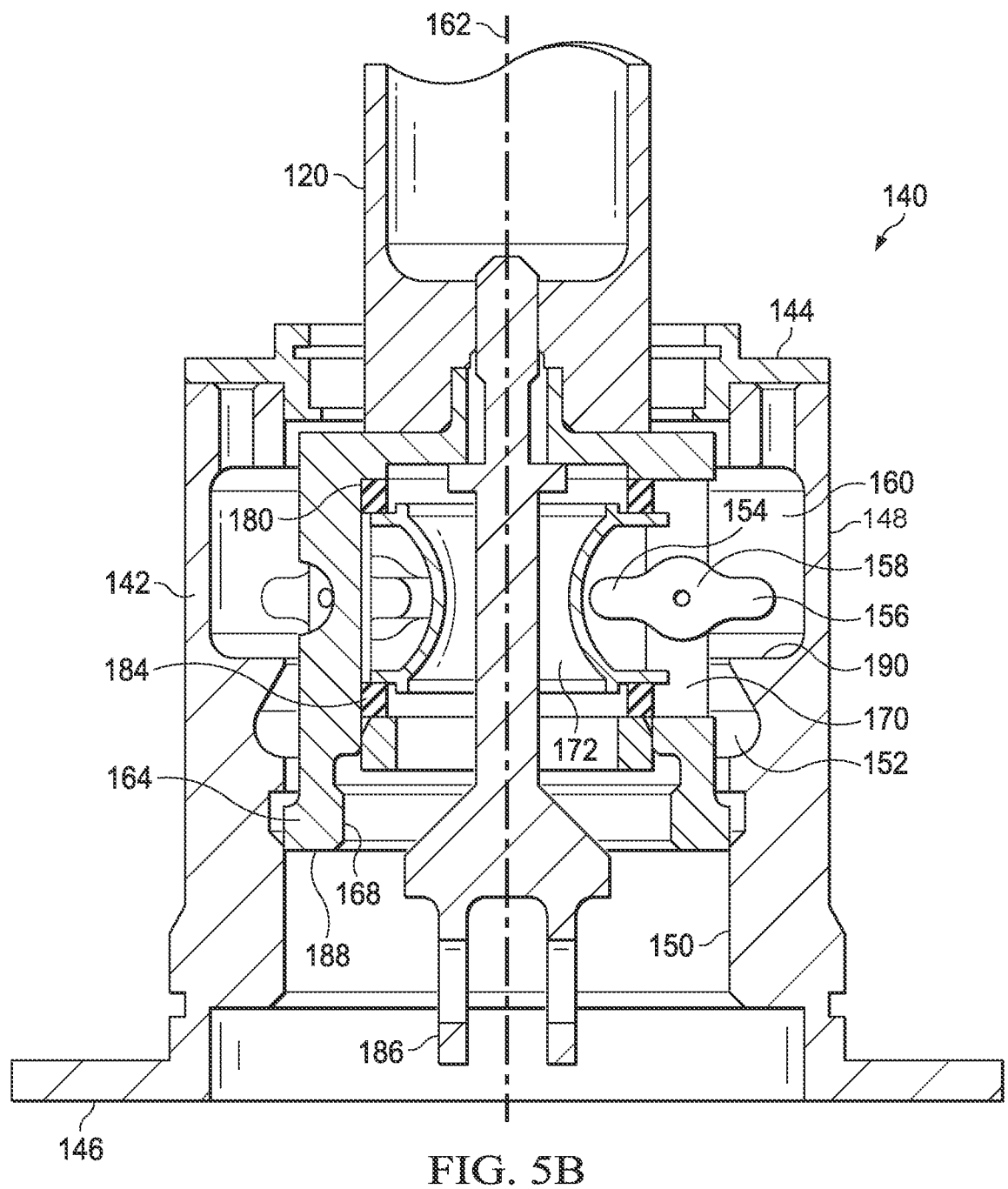
FIG. 5B is a cross-sectional side view of the cam-locking system for use with the stow system of FIG. 4A, shown in an unlocking position.
Figure 5C:
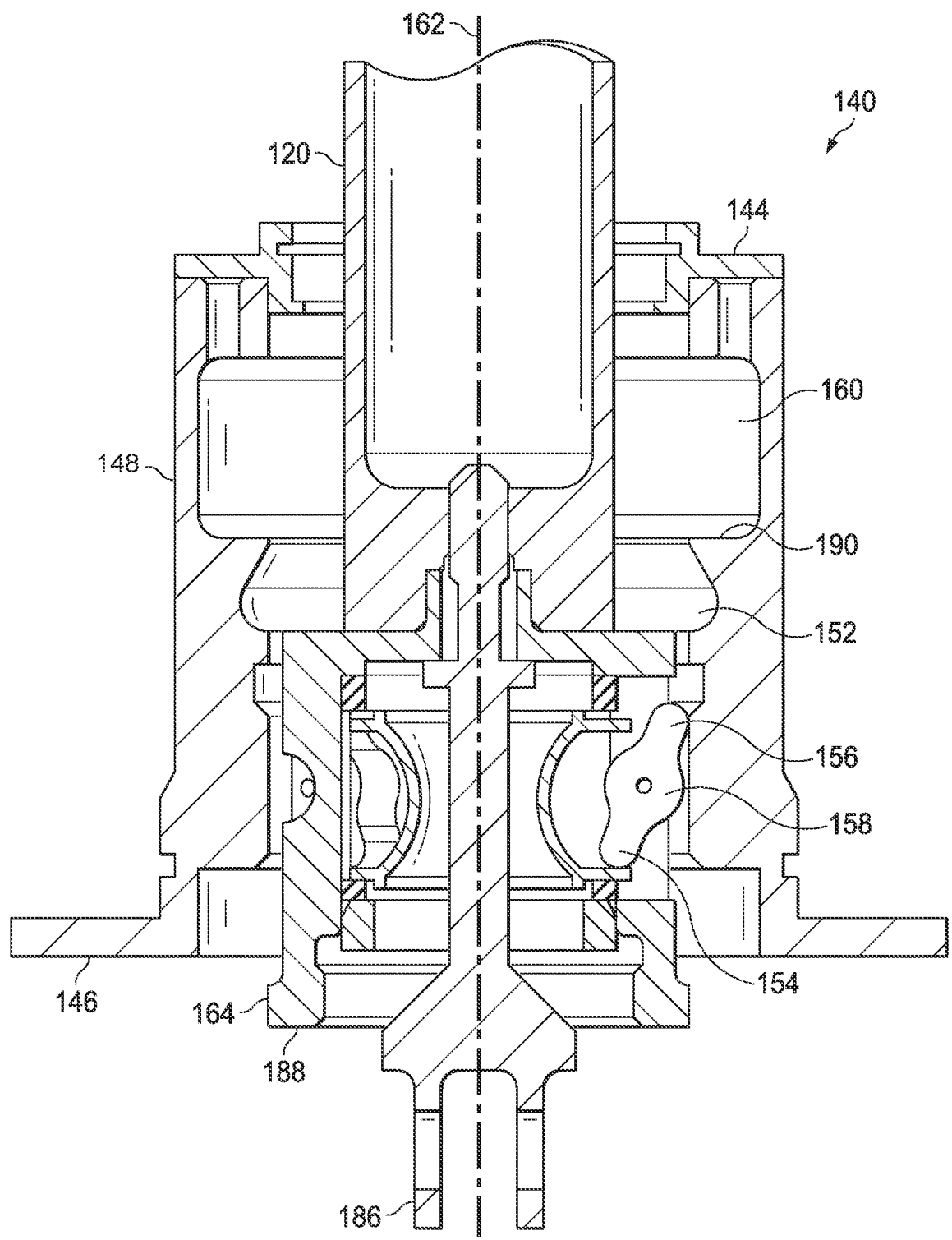
FIG. 5C is a cross-sectional side view of the cam-locking system for use with the stow system of FIG. 4A, shown in a disengaged position.

Referring now to FIGS. 5A-5C, a cam-locking system 140 for use with retractable driveshaft 120 is shown. Cam-locking system 140 is located within engine reduction gearbox 118. Cam-locking system 140 includes a housing 142 that has a first end 144, an opposite second end 146, an exterior surface 148, and an interior surface 150 generally opposite exterior surface 148. Interior surface 150 includes a catch recess 152 configured to catch and secure one of a first end 154 or a second end 156 of cams 158. Interior surface 150 of housing 142 further includes an unlocking gap 160 located longitudinally between catch recess 152 and first end 144 of housing 142. Unlocking gap 160 is configured to permit rotation of cam 158 to an unlocked position, wherein a length of cam 158 is generally orthogonal to a central axis 162 of housing 142. Central axis 162 extends through first end 144 and second end 146 of housing 142. As shown, central axis 162 is coaxial with rotation axis 122. However, central axis 162 may be offset from rotation axis 122. Catch recess 152 and unlocking gap 160 may have a uniform shape around a circumference of interior surface 150 of housing 142. Alternatively, interior surface 150 may include a plurality of catch recesses 152 and unlocking gaps 160 aligned with each cam 158.

A cam carrier 164 is located at least partially within housing 142. Cam carrier 164 includes an outside surface 166 generally facing interior surface 150 of housing 142 and an inside surface 168 opposite outside surface 166. Cam carrier 164 includes an aperture 170 in which cam 158 is rotatably coupled. Cam 158 is oriented within aperture 170 such that first end 154 and second end 156 of cam 158 extend beyond inside surface 168 and outside surface 166, respectively, when a length of cam 158 is oriented transversely to central axis 162. Moreover, as discussed below, second end 156 is configured to interact with interior surface 150 while cam carrier 164 translates along central axis 162.

A shuttle 172 is located at least partially within cam carrier 164. Shuttle 172 includes a first cam contact surface 174 facing generally towards second end 146 of housing 142 and an opposite second cam contact surface 176 facing generally towards first end 144 of housing 142. Shuttle 172 may be rigidly coupled to, or even unitarily part of, cam carrier 164. However, as shown, a top surface 178 of shuttle 172 may be separated from cam carrier 164 by a first elastic member 180 and a bottom surface 182 of shuttle 172 may be separated from cam carrier 164 by a second elastic member 184. First elastic member 180 and second elastic member 184 allow for shuttle 172 to have some movement along central axis 162 relative to cam carrier 164, and provide resistance to unlocking of cam 158, and therefore, disengagement of retractable driveshaft 120. First elastic member 180 and second elastic member 184 may be elastomeric, metallic springs, or any other elastically deformable material or device suitable for use.

To engage retractable driveshaft 120 with mid-wing gearbox 124, an actuator post 186, extending from an actuation device (not shown), applies a vertical force against cam carrier 164, causing cam carrier 164 to translate vertically along central axis 162. In turn, cam carrier 164 transmits the vertical force to retractable driveshaft 120. Retractable driveshaft 120 is moved vertically until splines 138 of retractable driveshaft 120 cooperatively engage complementary splines (not shown) on mid-wing gearbox 124. When cam carrier 164 moves towards first end 144 of housing 142, second end 156 of cam 158 slides along interior surface 150 of housing 142. When second end 156 of cam 158 enters catch recess 152, and before it reaches unlocking gap 160, actuator post 186 reverses direction and cam carrier 164 lowers until second end 156 of cam 158 contacts the bottom of catch recess 152. In this position, first end 154 of cam 158 is bearing against first cam contact surface 174 and second end 156 of cam 158 is bearing against catch recess 152. This position prevents downward movement of cam carrier 164 along central axis 162, and therefore, prevents retractable driveshaft 120 from disengaging from mid-wing gearbox 124. This locked position is shown in FIG. 5A. At this point, actuator post 186 may be withdrawn completely from cam-locking system 140. Cam carrier 164 may be biased toward second end 146 of housing 142, thereby maintaining tension between cam 158 and catch recess 152. While actuator post 186 is shown extending through cam carrier 164, actuator post 186 may alternatively apply the vertical force against a bottom surface 188 of cam carrier 164.

To disengage retractable driveshaft 120 from mid-wing gearbox 124, actuator post 186 again applies a vertical force against cam carrier 164. However, in order to unlock cam-locking system 140, actuator post 186 moves cam carrier 164 above the locked position shown in FIG. 5A to an unlocked position shown in FIG. 5B. At this location, second end 156 of cam 158 rotates into unlocking gap 160 so that the length of cam 158 is generally orthogonal to central axis 162. Rotation of cam 158 to a position orthogonal to central axis 162 may be aided by biasing cam 158 towards that position, either by weighting cam 158 or spring biasing cam 158 towards that orientation. When cam 158 loses contact with interior surface 150 of housing 142, actuator post 186 reverses direction and begins to lower cam carrier 164, and therefore retractable driveshaft 120, along central axis 162. While cam carrier 164 descends, second end 156 of cam 158 contacts a lower surface 190 of unlocking gap 160, causing second end 156 of cam 158 to rotate above first end 154 of cam 158, thereby allowing cam carrier 164 to descend all the way to the disengaged position shown in FIG. 5C, wherein splines 138 of the retractable driveshaft 120 are withdrawn from mid-wing gearbox 124, and retractable driveshaft 120 is withdrawn from stowable wing assembly 104, as shown in FIGS. 4B and 4C. To reengage retractable driveshaft 120 with mid-wing gearbox 124, the above-described engagement process may be repeated.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:
1. A locking mechanism, comprising:
a housing having a first end and an opposite second end, an exterior surface extending from the first end to the second, and an interior surface generally opposite the exterior surface, the interior surface including a catch recess, the housing having a central axis extending through the first end and the second end;
a cam carrier located at least partially within the housing and being capable of translating along the central axis of the housing, the cam carrier having an outside surface generally facing the interior surface of the housing, an inside surface opposite the outside surface, and an aperture extending from the outside surface to the inside surface of the cam carrier; and a cam rotatably coupled to the cam carrier about a cam axis, the cam having a first end and a second end opposite the first end, the cam having a length measured from the first end to the second end and a width transverse to the length, the length being greater than the width, the second end being configured to cooperatively engage the catch recess of the interior surface of the housing;

wherein the locking mechanism is configured such that when the cam is cooperatively engaged with the catch recess of the housing the cam carrier is prevented from translating toward the second end of the housing; and wherein the cam axis is movable along a longitudinal length of the catch recess.

2. The locking mechanism of claim 1, wherein the cam carrier is configured to move a shaft therewith.

3. The locking mechanism of claim 2, wherein the housing further comprises an unlocking gap adjacent to the catch recess, wherein the unlocking gap is configured to permit the cam to rotate.

4. The locking mechanism of claim 3, further comprising:
a shuttle located at least partially within the cam carrier, the shuttle having a first cam contact surface facing generally towards the second end of the housing and an opposite second cam contact surface facing generally towards the first end of the housing.

5. The locking mechanism of claim 4, wherein the cam is configured so the first end of the cam contacts the first cam contact surface of the shuttle when the second end of the cam is cooperatively engaged with the catch recess.

6. The locking mechanism of claim 5, further comprising:
a first elastic member between a top surface of the shuttle and the cam carrier; and
a second elastic member between a bottom surface of the shuttle and the cam carrier.

7. The locking mechanism of claim 6, wherein the cam is biased so the length of the cam is orthogonal to the central axis of the housing.

8. The locking mechanism of claim 7, wherein the cam carrier is biased towards the second end of the housing.

* * * * *